United States Patent Office 2,794,668
Patented June 4, 1957

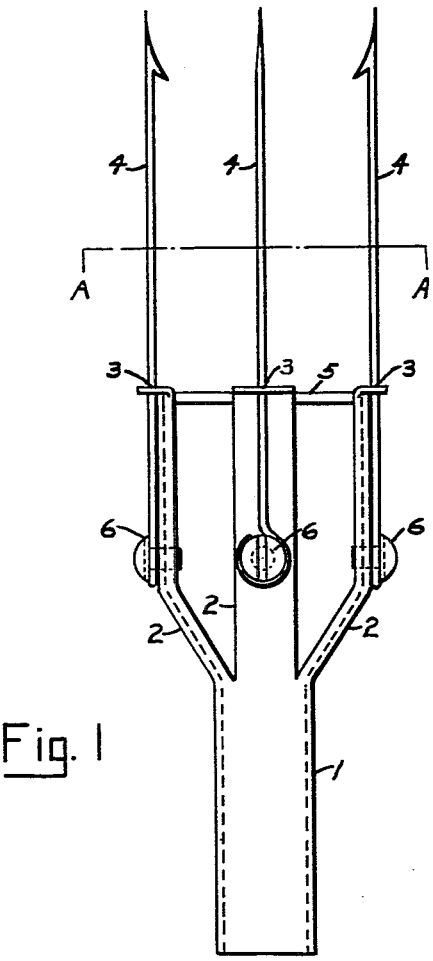
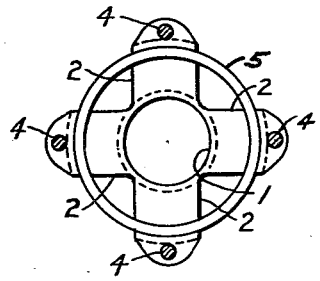
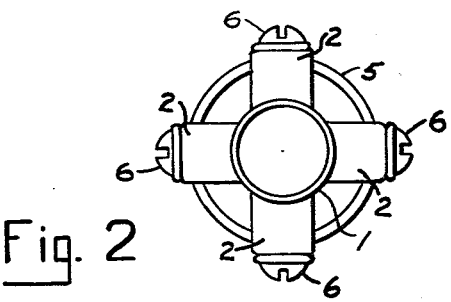
Fig. 1
Fig. 2
Fig. 3
Fig. 4
INVENTOR.
A. Homer Christensen
BY

2,794,668
GIG FOR SPEARING FISH AND FROGS

Arne Homer Christensen, Cutler Ridge, Fla.

Application December 6, 1955, Serial No. 551,470

1 Claim. (Cl. 294—61)

This invention relates to improvement in a gig used for spearing fish and frogs, and more particularly to the type of gig with multiple tines.

The usual type of gig consists of a head equipped with one or more sharpened and barbed tines permanently attached thereto, which head is provided with means for attaching a pole or handle thereto.

In using a gig for spearing fish or frogs; it often happens that one or more tines may become bent or broken, caused by the tines striking a rock or other hard object in the water, thus rendering the gig useless until it can be repaired.

The object of this invention is to provide a gig head with a plurality of tines, which tines may be readily removed and replaced with new ones, in the event they should become damaged, bent or broken.

One embodiment of this invention is comprised of a tubular member or shank, one end of which is adapted to fit over and be attached to a suitable handle; the opposite end of this tubular member is divided into a number of equal segments, in this case four, by means of saw cuts or slits which are cut through the wall of the said tubular member and extend parallel with its axis a distance approximately half its length; each of these segments are bent out at an angle of about 45 degrees for a distance of about an inch, then bent back to a position parallel to the axis of the tubular section or shank, thus forming an enlarged, basket shaped section; the outer ends of these segments or fingers are again bent over and outward at right angles a short distance and holes are provided in this bent over tip to allow the tines to be inserted through these holes.

To retain the outer ends of these segments or fingers in their proper relation to each other; a ring of suitable material is fitted in place within the circle of holes, and brazed or welded to the ends of the segments.

Holes are provided, tapped for machine screws in each segment adjacent to where the segments are bent back parallel to the axis of the tubular shank, said tapped holes with center lines at right angles to the center line of the shank.

Tines of suitable length are supplied with sharp points and barbs on one end, and a partly open eye on the opposite end, which eyes are adapted to receive the above mentioned machine screws.

The tines are assembled to the shank by hooking the eye in the hole in the flanged out tips of the segments, sliding the end of the tine with the eye down to a position opposite the tapped hole, and inserting the machine screw and tightening it.

It will readily be seen from the foregoing description that damaged or broken tines may be quickly and easily removed and replaced with new ones.

Referring now to the drawings, wherein similar numerals refer to similar parts throughout the various views:

Fig. 1. is a side elevation of the gig head.
Fig. 2 is an end elevation taken at the handle end.
Fig. 3 is a sectional view taken on line A—A of Fig. 1.
Fig. 4 is a side elevation of a tine.

In the present embodiment of this invention as described and shown in the drawings; a shank of tubular section 1, is slit into a plurality of segments at one end, and each segment 2, is bent outwards for a short distance then bent back to a parallel position; the extreme ends of the segments 2, are bent outwards at 90 deg. and provided with holes 3, to allow the tines 4, to pass through; a metal ring 5, is brazed or welded to the outer ends of the segments 2, to make the structure rigid.

Machine screws 6, pass through the eye 7, in the tine 4, to secure the tine 4, to the segment 2.

Although I have shown my invention in considerable detail I do not wish to be restricted to the precise arrangement of parts as shown in the drawings and described in the specification, and that the words I have used were words of description and not of limitation, and that changes may be made in design and arrangement within the purview of the following claim.

What I claim is:

A gig for spearing fish and frogs, comprising a tubular member split into a plurality of segments and each segment bent outward for a portion of its length then bent back to a position parallel with the centerline of the member to form an enlarged portion of the tubular section, and this enlarged section to extend approximately half the length of the tubular section, and the extreme ends of the segments bent outward at an angle of 90 degrees and provided with holes through which to pass tines which are straight bars pointed and barbed at one end and with a partly open eye at the opposite end; each tine secured to the segment with a machine screw at a point adjacent to the first bend in the segment; a retaining ring attached to the outer ends of all segments by brazing or otherwise to tie the outer ends of the segments together rigidly.

References Cited in the file of this patent
UNITED STATES PATENTS

| | | |
|---|---|---|
| 2,509,113 | Sweet | May 23, 1950 |
| 2,529,938 | Herndon | Nov. 14, 1950 |